United States Patent [19]

Abraham et al.

[11] Patent Number: 4,857,423
[45] Date of Patent: Aug. 15, 1989

[54] OVERCHARGE PROTECTION OF SECONDARY, NON-AQUEOUS BATTERIES

[75] Inventors: Kuzhikalail M. Abraham, Needham, Mass.; David M. Pasquariello, Pawtucket, R.I.

[73] Assignee: EIC Labotatories, Inc., Norwood, Mass.

[21] Appl. No.: 284,746

[22] Filed: Dec. 9, 1988

Related U.S. Application Data

[63] Continuation of Ser. No. 126,629, Nov. 30, 1987, abandoned.

[51] Int. Cl.[4] .................. H01M 6/14; H01M 6/16
[52] U.S. Cl. ................................ 429/194; 429/148; 252/622
[58] Field of Search .............. 429/194, 198; 252/62.2, 252/182.1

[56] References Cited

U.S. PATENT DOCUMENTS 4,459,343  7/1984  Gibbons et al. ............... 429/111
4,547,439 10/1985  Genies ......................... 429/198 X Primary Examiner—Stephen J. Kalafut
Attorney, Agent, or Firm—Charles Hieken

[57] ABSTRACT

The invention features the use of redox reagents, dissolved in non-aqueous electrolytes, to provide overcharge protection for cells having alkali metal negative electrodes (anodes). In particular, the invention features the use of organometallic compounds, known as metallocenes, as redox shuttle reagents to provide overcharge protection. Specific examples of this invention are bis(cyclopentadienyl)iron, known as ferrocene; bis(n-butyl-cyclopentadienyl)iron, known as butylferrocene; bis(cyclopentadienyl)nickel, known as nickelocene; and bis(cyclopentadienyl)cobalt, known as cobaltocene. An example of a rechargeable battery in which these redox reagents are used as an Li negative electrode and a $TiS_2$ positive electrode.

13 Claims, 1 Drawing Sheet

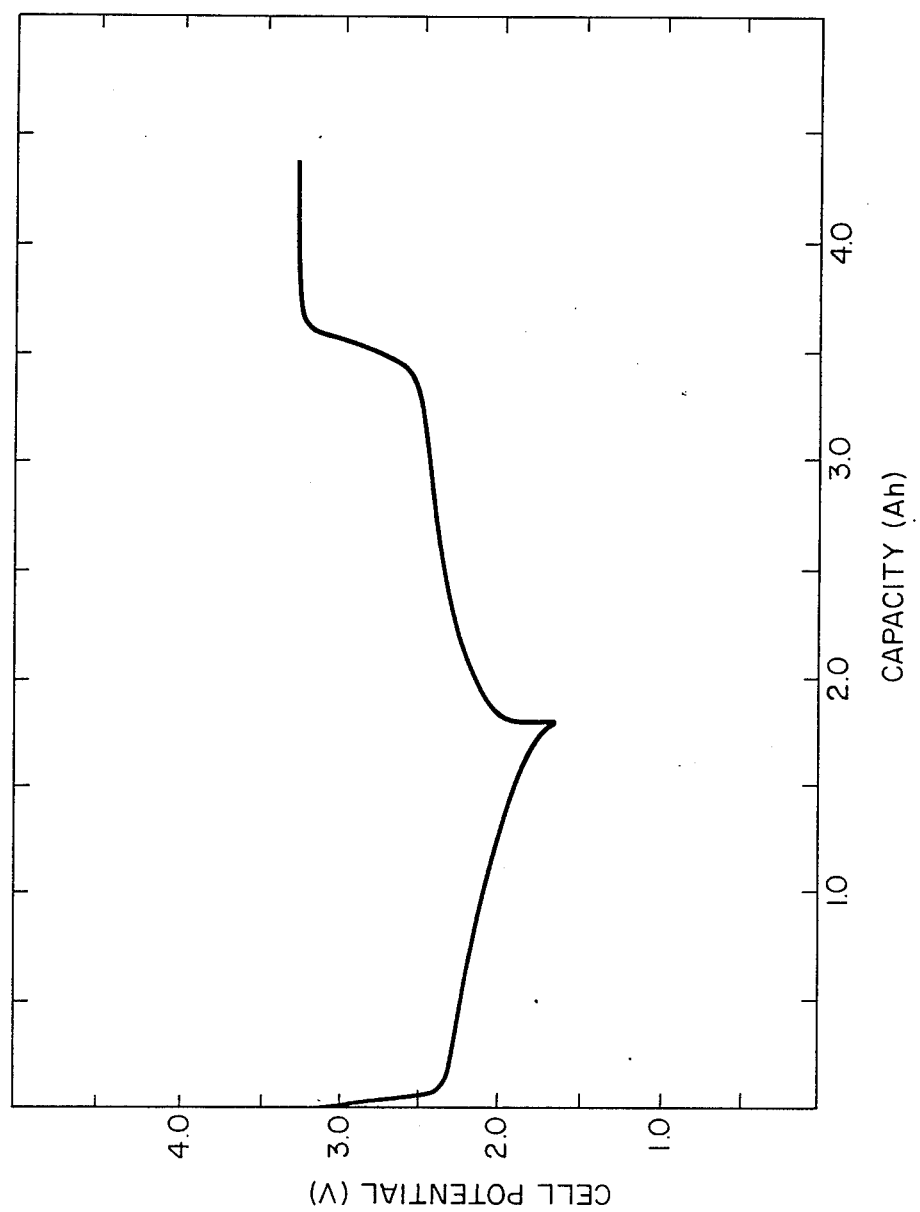

OVERCHARGE PROTECTION OF SECONDARY, NON-AQUEOUS BATTERIES

This applications is a continuation of Ser. No. 126,629, filed Nov. 30, 1987, now abandoned.

This invention was made with Government support under contract DAAL01-85-C-0444 awarded by the Department of the Army. The Government has certain rights in this invention. This invention relates to electrochemical cells and more particularly to improved non-aqueous electrolytes for cells incorporating alkali metal negative electrodes (anodes), and especially lithium containing anodes. The improvement features the use of redox reagents, dissolved in non-aqueoous electrolytes, to provide overcharge protection.

A crucial component in an ambient temperature secondary Li cell is the electrolyte solution. It is desirable to have a non-aqueous solvent or a mixture of solvents which dissolves an appreciable amount of Li salts to form highly conducting solutions. The electrolyte should afford high efficiency for cycling of the Li electrode and exhibit good thermal stability up to 70° C., a usual upper temperature limit for operation of ambient temperature Li batteries. A highly desirable electrolyte solution for Li batteries is described in U.S. Pat. No. 4,489,145. It comprises a solution of $LiAsF_6$ dissolved in a mixed solvent of tetrahydrofuran (THF) and 2-methyl-tetrahydrofuran (2-Me-THF) containing 2-methylfuran (2-Me-F). Lithium-titanium disulfide ($Li/TiS_2$) rechargeable cells utilizing this electrolyte composition, and having a capacity of about 5 ampere-hour (Ah), have been discharged and charged (cycled) one hundred to two hundred times. Reference is made to K. M. Abraham, D. M. Pasquariello and F. J. Martin, J. Electrochem. Soc. 133, 643 (1986) and K. M. Abraham, J. L. Goldman and F. J. Martin, in "Proceedings of the 31st Power Sources Symposium", published by the Electrochemical Society, Pennington, N. J. (1984) pp. 98). As described in these publications, $Li/TiS_2$ cells are normally cycled over the potential range of 1.5 to 2.7V.

Unlike aqueous cells, organic electrolyte cells may not be overcharged. In the case of cells containing solvents such as THF and 2,Me-THF, these solvents become oxidized at ~3.65V and this process leads to degradation of the cells' cycling ability. In laboratoory testing of these batteries, the voltage limits of 1.6 and 2.8V are carefully controlled by electronic cyclers to avoid overcharge. Electronic overcharge control comprises a sensing circuit which prevents current flowing into the cell once it reaches the voltage corresponding to complete charge, i.e. 2.7V for the $Li/TiS_2$ cell. The incorporation of electronic overcharge controllers in cells lowers the energy density of the battery and increases battery cost.

Overcharge control is especially important when single cells are configured to form a battery. In this case, cell capacity balance may be lost, especially, after repeated cycles of the battery. That is to say the accessible capacity of individual cells may not remain equal. When a battery possessing at least one cell with a lower capacity than the others is charged, the cathode potential of that cell will rise above the normal upper voltage limit. Oxidative degradation of the electrolyte will occur if the electrolyte is not stable at these higher potentials, and this will degrade the cycle life of the battery at an accelerated rate. Even if the electrolyte does not decompose, the capacity of the cells in the battery will increasingly get out of balance with each additional cycle since the stronger cells will not be charged to their full capacity because the weaker cell will contribute a larger fraction of the total cutoff voltage for the battery. While electronic overcharge control circuits for each individual cell can mitigate the imbalance problem in a battery, such devices add significantly to the cost of the battery and decrease its energy density.

A better approach to controlling overcharge is to use a redox shuttle. Here, a material with an appropriate oxidation potential is dissolved in the electrolyte. This material is unreactive until the cell is fully charged. Then at a potential slightly above the normal charge cutoff voltage of the cell, the redox shuttle is electrochemically converted to products which react together to form the starting materials. The cell potential during overcharge will be "fixed" at the oxidation potential of the redox shuttle. The oxidized products diffuse to the anode where they are regenerated. The reduced species are in turn oxidized at the cathode and thus the fixed potential at the cathode is maintained indefinitely, until the charging is terminated.

Necessary properties of a redox shuttle include: good solubility in the electrolyte; an oxidation potential slightly higher than the normal charge limit of the cell but lower than the oxidation potential of the electrolyte; the ability to reduce the oxidized form at the anode without side reactions; and chemical stability in the cell of both the oxidized and reduced forms of the shuttle reagent.

Accordingly, an object of this invention is to provide a means of chemical overcharge protection to secondary non-aqueous cells by the use of redox reagents.

The invention features a rechargeable electrochemical cell with includes an anode, a cathode, and an electrolyte. The electrolyte is a non-aqueous solvent or a mixture of non-aqueous solvents in which one or more salts and the redox reagent are dissolved. The redox reagent is present in an amount sufficient to maintain proper mass transport for the desired steady overcharge current for the cell.

A particular class of redox reagents for overcharge protection are metallocenes, in which cyclic $\pi$ electron donors such as the pentahaptocyclopentadienyl ($h^5$-$C_5H_5$) and hexahaptobenzene ($h^6$-$C_6H_6$) and related molecules combined with metal atoms to form complexes of the general formula:

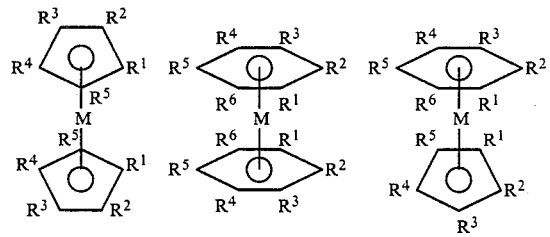

-continued

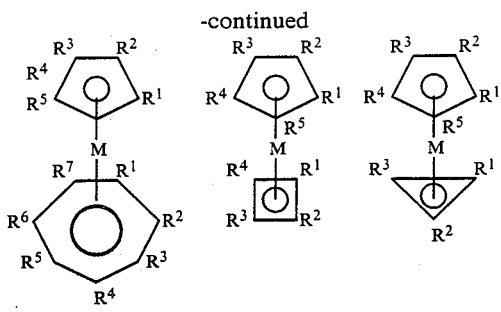

where, M represents metals such as iron, cobalt, nickel, chromium or tungsten and $R^1$ through $R^6$ stand for H or alkyl groups such as methyl, ethyl or butyl.

In preferred embodiments the redox shuttle is ferrocene, or n-butylferrocene, having the structural formulas shown below, and the rechargeable cell is a $Li/TiS_2$ cell containing a mixed ether electrolyte of the composition described in the teachings of U.S. Pat. No. 4,489,145.

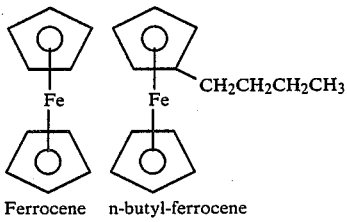

Ferrocene    n-butyl-ferrocene

It has been discovered that ferrocene and its derivatives, such as n-butyl-ferrocene, 1,1-dimethylferrocene, N,N-dimethylaminomethylferrocene and decamethylferrocene, are particularly useful as overcharge protection additives for the $Li/TiS_2$ cell.

The choice of a particular redox reagent will vary with the cathode material used in a rechargeable Li cell. Thus, nickelocene would be most suited for use with cells in which the cathode is fully charged by 2.65V and cobaltocene for cells in which the cathode is fully charged by 1.70V.

Other features, objects and advantages will become apparent from the following specification when read in connection with the accompanying drawing, the single figure of which shows a cycling curve showing overcharge for an exemplary embodiment of the invention.

Cyclic voltammetry was used to screen candidates for use as redox shuttle reagents for overcharge protection in rechargeable Li cells. Results of such experiments are given in Table 1.

TABLE 1

| REDOX POTENTIAL RANGES OF CHEMICAL SHUTTLE REAGENTS | |
|---|---|
| Compound | Redox Potential Range (V vs. $Li^+/Li$) |
| Ferrocene | 3.05–3.38 |
| 1,1-Dimethylferrocene | 3.06–3.34 |
| n-Butylferrocene | 3.18–3.50 |
| N,N-Dimethylamino-methylferrocene | 3.13–3.68 |
| Nickelocene | 2.63–3.15 |
| Cobaltocene | 1.70–2.13 |

The reactions which are believed to be responsible for the suitability of these materials as redox shuttle reagents for overcharge protection are given in the following equations, illustrated with n-butylferrocene:

At positive electrode (cathode): n-butylferrocene $\rightarrow$(n-butylferrocene)$^+$ +$e^-$ At negative electrode (anode):
(n-butylferrocene)$^+$ +$e^-$$\rightarrow$n-butylferrocene In $Li/TiS_2$ cells containing ether electrolytes, oxidation of the redox reagent should take place between ~2.8 and 3.5V vs. $Li^+/Li$. Of the compounds listed in Table 1, ferrocene and its derivatives are the most likely candidates for overcharge protection of such cells.

In a high energy density ambient temperature cell, the positive electrode material preferably consists of titanium disulfide ($TiS_2$). However, the positive electrode material may comprise other transition metal compounds and notably other insoluble chalcogenides of titanium, zirconium, hafnium, vanadium, niobium, tantalum, molybdenum, tungsten, rhenium, platinum, germanium, iron, tin and lead, e.g., $TiS_3$, $TiSe_2$, $TiSe_3$, $ZrS_2$, $ZrS_3$, $HfS_2$, $HfS_3$, $VS_2$, $VS_3$, $NbS_2$, $TaS_2$, $TaS_3$, $ZrSe_2$, $ZrSe_3$, $HfSe_2$, $HfSe_3$, $VSe_2$, $Vse_3$, $NbSe_2$, $NbSe_3$, $TaSe_2$, $TaSe_3$ and $MoSe_3S$ and alloys of the foregoing cations such as $ZrHfSe_2$. Other positive electrode materials may comprise mixed sulfides such as $Fe_xV_{1-x}S_2$ and $Cr_xV_{1-x}S_2$ (x<1) and sulfide compounds such as $NiPS_3$ and metal oxides such as $MoO_3V_6O_{13}$, $V_2O_5$ and $Cr_xO_y$ where y/x is between 1.5 and 3. Soluble and partially soluble positive electrode materials also may be used, notably $I_2$, $Br_2$, $Cl_2$, $SO_2$, $S$, $CuCl$, $CuCl_2$, $AgCl$, $FeCl_2$, $FeCl_3$, and other transition metal halides. Other soluble positive electrode materials that may be used are lithium polysulfide ($Li_2Sn$) and organic compounds such as chloranil and fluoranil. The requirement for the selection of a metallocene for use as redox shuttle reagent for a given positive electrode is that the oxidation potential of the metallocene be slightly higher than the full charge limit of the cell containing the cathode.

The concentration of the solute (ionic conductor) in the solvent is not critical. Usually, an amount sufficient to yield the desired level of conductivity is used. By way of example, the salt concentration should be such as to give a specific conductivity of about $5 \times 10^{-3}$ $10^{-3}$ ohm$^{-1}$at about 22° C. The preferred salt is $LiAsF_6$. However, other lithium salts such as $LiClO_4$, $LiBR_4$ (where R=alkyl or aryl groups), $LiPF_6$, $LiAlBr_4$, $LiSCN$, $LiAlCl_4$, $LiBF_4$, and lithium salts of organic acids such as trichloroacetic, trifluoromethane sulfonic and formic acids can be used.

The preferred electrolyte solvents are THF and 2-Me-THF. However, embodiments of the invention are equally applicable with other organic solvents such as dioxolane, 1,2-dimethoxyethane (DME), diethylether, dimethoxymethane, trimethoxymethane, tetrahydropyran, 2-methyltetrahydropyran, 3-methyltetrahydrofuran, 2,5-dimethyltetrahydrofuran, and 2,5-dimethyltetrahydropyran, propylene carbonate, ethylene carbonate, butyrolactone and mixtures of these solvents.

The cells used to demonstrate the advantages of this invention contained 7.1 Ah of Li, 2.3 Ah of $TiS_2$, and at lest one of the shuttle reagents described above dissolved in a mixed ether electroylte solution comprised of $LiAs_6$ in the THF: 2-Me-THF: Me-F mixed ethers of the teachings of U.S. Pat. NO. 4,489,145.

The $Li/TiS_2$ cells were cycled galvanostatically with the aid of standard cycling equipment. The potential limits for normal cycling were 1.6V for discharge, and 2.8V for charge. The cells were discharged to a 100% depth at 0.75 or 1.5 mA/cm$^2$, and charged at 0.38 or 0.75 mA/cm$^2$.

Overcharge experiments were performed either by changing the upper voltage limit to a value between 3 and 3.5V versus Li+/Li or by potentiostatically setting the positive electrode (TiS$_2$) at a potential in the range between 3 and 3.5V versus Li+/Li.

Finally, the occurrence of oxidation reactions of the type in equation [1] above was demonstrated by electroylsis experiments followed by spectroscopic analysis of the resulting solutions.

The following illustrative examples further clarify the invention to those skilled in the art.

EXAMPLE 1

A Li/TiS$_2$ cell of the description given above was filled with about 8 grams of electrolyte solution containing LiAsF$_6$ in a mixed ether (THF/2MeTHF/2MeF) and 1.0 molar n-butylferrocene. The cell was cycled at a discharge current density of 0.75 mA/cm$^2$ and a charge current density of 0.38 mA/cm$^2$ at room temperature. After 34 cycles the upper voltage limit was raised to 3.5V, and the cell was allowed to overcharge. Defining overcharge as charge obtained at a potential greater than 2.8V vs. Li, 866 mAh of overcharge was obtained. As FIG. 1 makes apparent, the overcharge was obtained at a constant potential of 3.25V vs. Li. A shuttle mechanism is evident since the overcharge is four times the charge expected for oxidation of the 8 mmol of n-butylferrocene contained in the cell.

EXAMPLE 2

A Li/TiS$_2$ cell of the description given above was filled with an electrolyte solution containing 0.25 molar ferrocene. The first cycle with this cell was performed between 1.6 and 2.8V at current densities of 1.5 mA/cm$^2$ for discharge and 0.75 mA/cm$^2$ for charge. The discharge capacity was 2.32 Ah, and 2.24 Ah were regained in the first charge. On the second cycle the potential limit was increased to 3.5V. An overcharge of 120 mAh was observed at a potential of 3.35V. After two more cycles under the regular cycling conditions, the cell was again overcharged. At a charge rate of 0.25 mA/cm$^2$, 114 mAh of overcharge (twice the charge expected for oxidation of the ferrocene) was observed, at a potential of 3.3V. The original cycling conditions were resumed, and a total of 124 cycles were obtained. The cycle life of the cell is the same as that obtained in similar cells without ferrocene. No adverse effect of either the overcharge or ferrocene on the cycle life of the Li/TiS$_2$ cell was observed.

EXAMPLE 3

A series of cells of the above description containing electrolyte solutions with n-butylferrocene were maintained at a constant potential, and the resulting current was observed.

A cell which contained the baseline ether mixture and LiAsF$_6$ with 0.15 molar n-butylferrocene, was maintained at 3.35V for 2.5 h. The initial current, 700 mA, decayed to a limiting value of 63 mA during the course of the experiment. The total overcharge was 324 mAh, or 10 times the number of coulombic equivalents expected for one-electron oxidation of n-butylferrocene.

A cell containing the same electrolyte solution, except that the n-butylferrocene concentration was increased to 0.5 M, was charged at 3.3 and 3.5V. At 3.3V, the current was 100 mA. The cell was held at 3.3V long enough to produce 8 mAh of overcharge. The voltage was then increased to 3.50V and held there for two hours. The limiting current was 124 mA and the charge was 319 mAh. The total overcharge was 327 mAh or 3 times the theoretical coulombic charge for this one-electron oxidation of the 4 mmol of n-butylferrocene present.

EXAMPLE 4

Electrolysis experiments confirmed that oxidation of the n-butylferrocene occurs at the cathode. A three compartment cell with the compartments separated by glass frits was filled with a 0.2 molar solution of n-butylferrocene in the mixed ether electrolyte with LiAsF$_6$ as the electrolyte.

The working electrode was a Teflon-bonded carbon electrode having 1.4cm$^2$/side, and the counter and reference electrodes were Li. The glass frit separator prevented significant mixing of the anolyte and the catholyte. The open circuit potential was 3.09V. When a constant charging current of 0.5 mA ($\sim$0.3 mA/cm$^2$) was applied, the oxidation potential was constant at 3.3V vs. Li+/Li. During charging for 18 h (9 mAh), the solution in the cathode compartment turned blue-green. Whereas UV-VIS specta of the starting solution showed two absorbance maxima at 440 and 320 nm, the blue-green solution showed a strong absorption maximum at 630 nm. The latter absorption is due to the formation of the oxidized form of n-butylferrocene.

Also, electrolytes containing redox shuttle reagents prepared in accordance with this invention may be used where the anode essentially includes or is a material other than lithium, e.g., sodium, potassium, magnesium, calcium or zinc, or mixtures thereof with or without lithium. Other modifications and advantages will be obvious to persons skilled in the art, and are within the following claims.

What is claimed is:

1. A rechargeable electrochemical cell having an anode, cathode and nonaqueous electrolyte in contact with said anode and cathode,
   said electrolyte including at least one nonaqueous solvent in which at least one salt and a redox reagent are dissolved,
   said redox reagent being present in an amount sufficient to maintain proper mass transport for a predetermined steady overcharge current for said rechargeable electrochemical cell to provide overcharge protection.

2. A rechargeable electrochemical cell in accordance with claim 1 wherein said redox reagent is a metallocene.

3. A rechargeable electrochemical cell in accordance with claim 2 wherein said metallocene has cyclic electron donors and related molecules that combined with metal atoms to form complexes of the general formula:

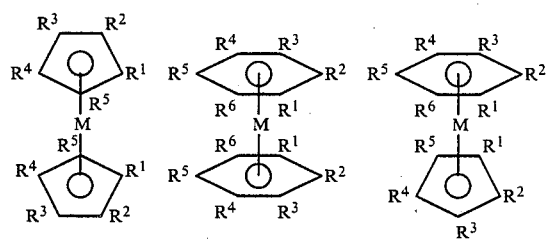

-continued

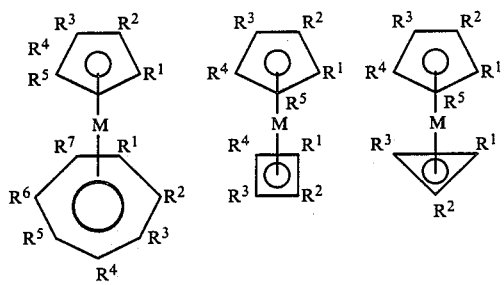

where, M represents a metal from the group consisting of iron, cobalt, nickel, chromium, and tungsten and R1 through R6 stand for H or alkyl groups from the group consisting of methyl, ethyl, butyl and propyl.

4. A rechargeable electrochemical cell in accordance with claim 2 wherein said metallocene is from the group consisting of ferrocene and n-butylferrocene respectively having the following structural formulas:

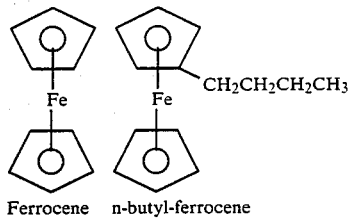

Ferrocene    n-butyl-ferrocene

5. A rechargeable electrochemical cell in accordance with claim 1 wherein said anode is lithium and said cathode is $TiS_2$.

6. A rechargeable electrochemical cell in accordance with claim 2 wherein said anode is lithium and said cathode is $TiS_2$.

7. A rechargeable electrochemical cell in accordance with claim 3 wherein said anode is lithium and said cathode is $TiS_2$.

8. A rechargeable electrochemical cell in accordance with claim 4 wherein said anode is lithium and said cathode is $TiS_2$.

9. A rechargeable electrochemical cell in accordance with claim 8 wherein said nonaqueous solvent is from the group consisting of cyclic ethers and mixtures thereof.

10. A rechargeable electrochemical cell in accordance with claim 8 wherein said nonaqueous solvent is a mixture of tetrahydrofuran, 2-methyltetrahydrofuran, and 2-methylfuran.

11. A rechargeable electrochemical cell in accordance with claim 8 wherein said salt is lithium hexafluoroarsenate.

12. A rechargeable electrochemical cell in accordance with claim 9 wherein said salt is lithium hexafluoroarsenate.

13. A rechargeable electrochemical cell in accordance with claim 10 wherein said salt is lithium hexafluoroarsenate.

* * * * *